US008884459B2

(12) United States Patent
Smith et al.

(10) Patent No.: US 8,884,459 B2
(45) Date of Patent: Nov. 11, 2014

(54) SAFETY ARRANGEMENT FOR A MOTOR VEHICLE

(75) Inventors: Bradley Smith, Plain City, UT (US); Heath Knight-Newbury, Bangalore (IN)

(73) Assignee: Autoliv Development AB, Vargarda (SE)

( * ) Notice: Subject to any disclaimer, the term of this patent is extended or adjusted under 35 U.S.C. 154(b) by 699 days.

(21) Appl. No.: 13/148,600

(22) PCT Filed: Feb. 8, 2010

(86) PCT No.: PCT/GB2010/000222
§ 371 (c)(1),
(2), (4) Date: Sep. 27, 2011

(87) PCT Pub. No.: WO2010/092330
PCT Pub. Date: Aug. 19, 2010

(65) Prior Publication Data
US 2012/0002338 A1  Jan. 5, 2012

(30) Foreign Application Priority Data

Feb. 10, 2009  (EP) ..................................... 09001817

(51) Int. Cl.
| B60L 1/00 | (2006.01) |
| B60L 3/00 | (2006.01) |
| H02G 3/00 | (2006.01) |
| H01M 2/34 | (2006.01) |
| B60K 28/14 | (2006.01) |
| H01M 10/44 | (2006.01) |
| H01M 10/6563 | (2014.01) |
| H01M 10/625 | (2014.01) |
| H01M 10/613 | (2014.01) |
| H01M 10/6569 | (2014.01) |

(52) U.S. Cl.
CPC ............... *B60K 28/14* (2013.01); *H01M 2/347* (2013.01); *Y02E 60/12* (2013.01); *H01M 10/44* (2013.01); *H01M 10/5067* (2013.01); *H01M 10/5016* (2013.01); *H01M 10/5004* (2013.01); *H01M 10/5079* (2013.01)
USPC .......................................................... 307/9.1

(58) Field of Classification Search
USPC ........................... 307/9.1, 10.1, 149, 150, 326
See application file for complete search history.

(56) References Cited

U.S. PATENT DOCUMENTS

| 6,422,027 | B1 * | 7/2002 | Coates et al. ................. 62/259.2 |
| 2001/0055712 | A1 | 12/2001 | Cittanova |
| 2003/0230177 | A1 | 12/2003 | Hamilton |
| 2008/0241667 | A1 | 10/2008 | Kohn et al. |

FOREIGN PATENT DOCUMENTS

| FR | 1231134 A | 9/1960 |
| JP | 63-216616 A | 9/1988 |
| JP | 2000-123695 A | 4/2000 |

OTHER PUBLICATIONS

International Search Report and Written Opinion of the ISA for PCT/GB2010/000222, ISA/EP, Rijswijk, NL, mailed Mar. 29, 2010.

* cited by examiner

*Primary Examiner* — Carlos Amaya
(74) *Attorney, Agent, or Firm* — Harness, Dickey & Pierce, P.L.C.

(57) ABSTRACT

A safety arrangement for a motor vehicle includes an electrical energy storage unit. The arrangement is particularly intended for use in a motor vehicle configured to be powered electrically, or by a so-called hybrid motor, and which hence comprises a high voltage electrical storage unit such as a battery or capacitor. The safety arrangement is configured to cool the storage unit in response to a signal indicative of an accident situation or battery malfunction, and comprises: a source of compressed inert gas and a flow-release actuator, the flow-release actuator being actuable upon receipt of an actuation signal so as to release a flow of inert gas from said source, the arrangement being configured such that said flow is directed substantially onto said storage unit so as to cool the unit.

14 Claims, 3 Drawing Sheets

US 8,884,459 B2

SAFETY ARRANGEMENT FOR A MOTOR VEHICLE

CROSS-REFERENCE TO RELATED APPLICATIONS

This application is a 371 U.S. National Stage of International Application No. PCT/GB2010/000222, filed Feb. 8, 2010. This application claims priority to European Patent Application No. EP 09001817.7, filed Feb. 10, 2009. The disclosures of the above applications are incorporated herein by reference.

FIELD

The present invention relates to a safety arrangement for a motor vehicle. More particularly, the invention relates to a safety arrangement which is configured for use in an electric vehicle, or a so-called hybrid motor vehicle.

BACKGROUND

In view of increasing concerns over the environmental impact of motor vehicles powered by internal combustion engines, there is now increased interest and importance in providing so called "cleaner" motor vehicles which produce less pollution in the form of gases which are deemed harmful to the environment. Accordingly, it is now becoming more and more common to provide motor vehicles which are powered electrically, at least during periods of their operation. For example, it has been proposed to provide electric vehicles which are driven by a large electrical motor drawing its power from a rechargeable battery.

It has also been proposed to provide so-called "hybrid" motor vehicles which typically combine an efficient internal combustion engine with an electric motor. Hybrid vehicles of this type are configured to be driven by the electric motor whenever possible or convenient, but are driven by the internal combustion engine when the propulsive power offered by the motor is insufficient to meet the instant performance demand, for example because the demand simply exceeds the performance limits of the motor, or because the source of electrical energy from which the motor draws its power contains insufficient charge. In such an arrangement, the motor typically draws its electric power from either a rechargeable battery or a series of capacitors, with the battery or capacitors being arranged to charge from an alternator connected to the engine when the combustion engine is running.

As will be appreciated, electrically powered vehicles, and so-called hybrid vehicles of the general type described above therefore require relatively large electrical energy storage units, such as batteries or capacitors, in order to provide sufficient electrical power for the propulsive motor. Accordingly, such storage units are typically configured to be very high voltage (typically approximately 300V) and to store a very significant amount of electrical energy (typically between 2-10 kWh), and as such represent a significant electrical hazard, particularly in the event of the vehicle being involved in a crash, or an internal short-circuit occurring within the battery.

As will be appreciated, electrical storage devices such as capacitors or batteries of the type described above can become extremely hot in the event of a short-circuit occurring either internally, or externally as a result of a crash, and hence represent a risk of fire or explosion in such circumstances.

Another concern with high-energy electrical arrangements of this type is that damage caused to a motor vehicle in the event of an accident can cause parts of the internal circuitry of the vehicle to become damaged and expose live wiring which presents a shock hazard for the driver and passengers of the vehicle, and also to any rescue personnel in attendance.

There is therefore a need for a safety arrangement which addresses these risks.

United States patent application 2001/0055712 discloses a storage cell battery incorporating a safety device.

In United States patent application 2003/0230177, there is disclosed apparatus incorporating an ignitable initiator which acts upon a severing element so as to sever a vehicle battery cable.

United States patent application 2008/0241667 discloses a tunable frangible battery pack system.

SUMMARY

It is an object of the present invention to provide an improved safety device for a motor vehicle.

Accordingly, the present invention provides a safety arrangement for a motor vehicle comprising an electrical energy storage unit, the arrangement being configured to cool said storage unit in response to a signal and comprising: a source of compressed inert gas and a flow-release actuator, the flow-release actuator being actuable upon receipt of an actuation signal so as to release a flow of inert gas from said source, the arrangement being configured such that said flow is directed substantially onto said storage unit so as to cool the unit, the safety arrangement further comprising a cutting mechanism operable under the action of said flow of gas to sever a conductor such as a cable or bus electrically connecting said storage unit to circuitry provided within said vehicle, thereby electrically isolating the storage unit from the vehicle's circuitry. As the compressed gas is released, the reduction of pressure within the gas tank 8 causes the gas to cool rapidly, thus enhancing its ability to cool the electrical energy storage unit.

The gas is preferably a substantially inert gas such as Argon. However other gases may be used providing they are substantially non-conductive of electricity. It is preferable for the gas to be non-flammable and non-oxidising. Nitrogen and Carbon Dioxide represent possible alternatives to Argon.

Advantageously, said flow-release actuator comprises a pyrotechnic charge (such as a squib) arranged to open an outlet from said source of compressed gas upon ignition. For example, the charge may be arranged to break a membrane initially provided across the outlet, either directly or by moving an element so as to puncture the membrane, or by firing a projectile through the membrane. Alternatively, the pyrotechnic charged can be arranged to move a sealing element upon ignition of the charge, so as to open up the outlet.

Preferably, said cutting mechanism comprises a knife arranged to be driven under the action of said flow of gas from an initial position in which it is substantially clear of said conductor, to a second position, the knife being arranged so as to cut said conductor during movement from said first position to said second position.

Advantageously, the knife is substantially non-conductive. For example the knife may be fabricated from a ceramic or plastic material.

In a preferred embodiment, the knife is connected to a piston, the piston being arranged so as to be moved under the action of said flow of gas, thereby moving the knife from said initial position to said cutting position.

Preferably, the safety arrangement further comprises at least one flow duct arranged to direct said flow of gas onto said storage unit and the arrangement is configured to combine a secondary flow of ambient air with said flow of gas. In a particularly preferred arrangement of this type, the secondary flow of ambient air is substantially entrained with said flow of gas.

Advantageously, the safety arrangement has at least one venturi arrangement comprising a primary flow passage having a constriction to accelerate said flow of gas, and an air inlet, the venturi arrangement being configured to draw ambient air through said inlet for combination with said flow of gas.

In one embodiment of the invention, said energy storage unit is provided within a housing, and the or each said venturi arrangement forms at least part of a nozzle arranged to direct said flow of gas, and the combined flow of ambient air through the housing.

Preferably, the safety arrangement of the present invention is configured for use with a said electrical storage unit of a type comprising a plurality of sub-units electrically connected in series (for example a plurality of battery cells or a plurality of capacitors), and the safety arrangement comprises a mechanism operable under the action of said flow of gas to electrically disconnect said sub-units from one another.

Said mechanism may be configured to electrically connect at least one of said sub-units across a discharge resistor substantially simultaneously with said electrical disconnection of the sub-units from one another. As will be appreciated, preferred embodiments are operable to connect each said sub-unit across a respective discharge resistor. The or each discharge resistor can take any convenient form, and in some embodiments can be configured as an electric fan.

In embodiments of the type mentioned above, incorporating one or more discharge resistors, it is preferable that the safety arrangement be configured to direct a flow of cooling gas onto the or each resistor.

Preferably, said mechanism comprises a piston arranged to move from an initial position to an operative position under the action said flow of gas, the piston being arranged to break the electrical connection between said sub-units during movement from said initial position towards said operative position.

Conveniently, the safety arrangement is provided in combination with an electrical storage unit configured such that the or each pair of adjacent said sub-units are electrically connected via a pair of contacts, each said contact extending from a respective said sub-unit and initially making electrical contact with the other said contact, wherein said piston is arranged to deform or move said contacts out of electrical contact with one another as it moves from said initial position to said operative position.

The arrangement may be configured such that movement of said piston from said initial position to said operative position is effective to deform or move each said contact into electrical connection with a said discharge resistor.

In a preferred arrangement, each said contact is pivotally connected to a respective sub-unit and hence is arranged to be moved pivotally by said piston from an initial position in which the contact is electrically connected to another said contact, and a second position in which the contact becomes electrically connected to said discharge resistor.

Preferably, said energy storage unit comprises either a capacitor or a battery.

According to another aspect of the present invention, there is provided a motor vehicle incorporating a safety arrangement of a type described above, wherein the motor vehicle is an electric vehicle or a hybrid vehicle.

So that the invention may be more readily understood, and so that further features thereof may be appreciated, embodiments of the invention will now be described by way of example with reference to the accompanying drawings in which:

DETAILED DESCRIPTION

Figure 1:
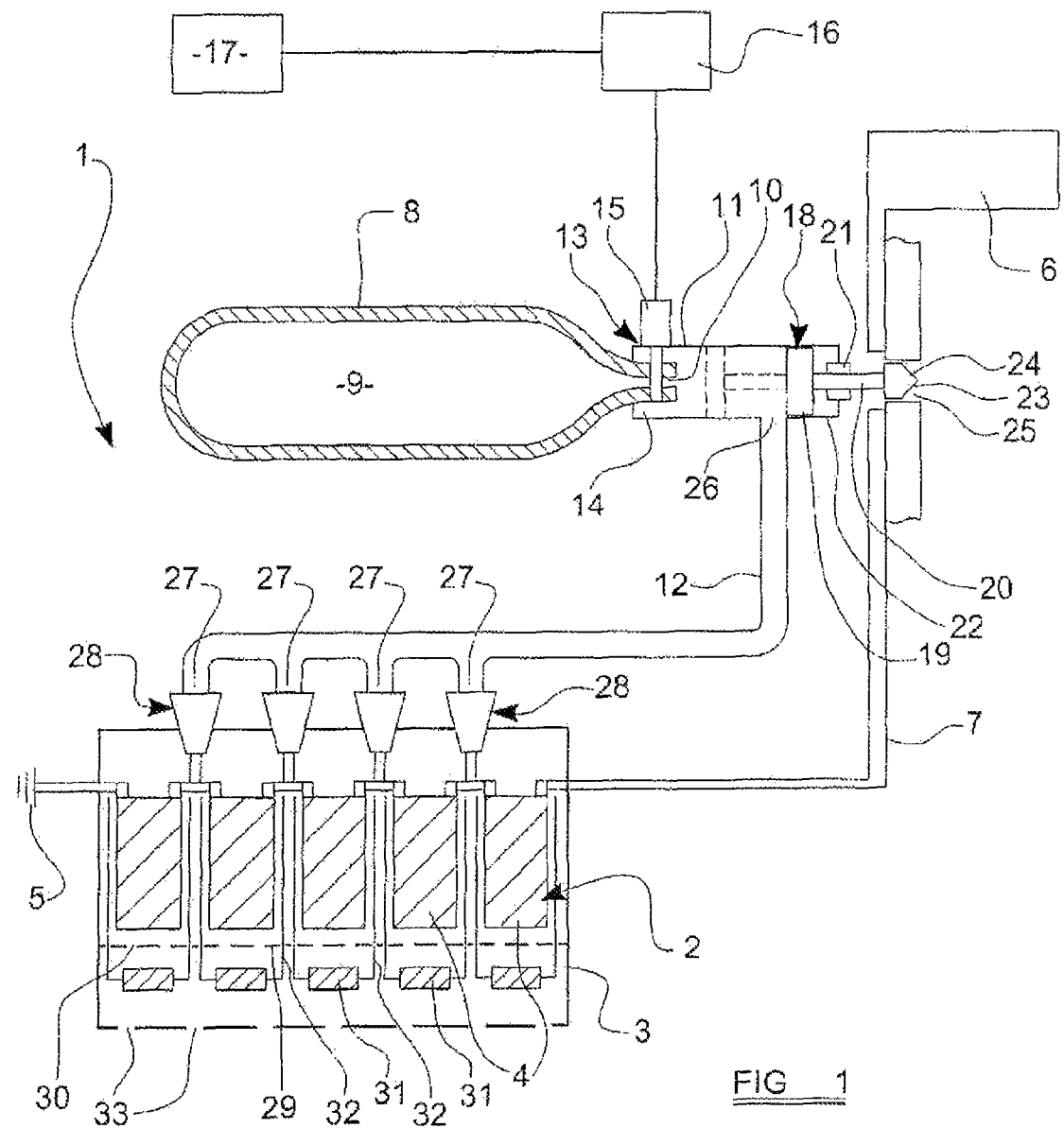
FIG. 1 is a schematic illustration showing a safety arrangement in accordance with the present invention, in combination with a multi-cell battery.

Referring now in more detail to FIG. 1, there is illustrated a safety arrangement 1 in combination with an electrical energy storage unit 2. The storage unit is provided within a housing 3 and in the particular embodiment illustrated, the storage unit 2 takes the form of a battery comprising a plurality of sub-units in the form of individual cells 4 electrically connected in series. For example, it is envisaged that the battery 2 could be a Lithium Ion battery comprising a series of cells connected so as to give the battery a total output voltage of approximately 300V and a total energy level of 2-10 kWh. Alternatively, however, it is envisaged that the storage unit could comprise a plurality of electrically connected capacitors.

As is generally conventional, the battery 2 is earthed by being electrically connected to the metal structure of the motor vehicle as illustrated schematically at 5, and is connected to the electrical circuitry 6 of the vehicle by a conductor 7 which may take the form of a cable or conductor bus.

The safety arrangement 1 includes a source of compressed gas, which preferably takes the form of a tank 8 containing a gas 9 under pressure. The gas used in the arrangement of the invention may be any gas which is substantially non-conductive of electricity. The gas is also preferably substantially inert, non-flammable and non-oxidising. Argon is particularly suitable, although Nitrogen or Carbon Dioxide could be used as alternatives.

The tank 8 has an outlet 10 which is arranged in fluid communication with an inlet port 11 of a manifold 12 which, as will be described in further detail below, serves as a flow duct arranged to direct the inert gas from the tank 8 to the battery 2 upon actuation of the system.

The outlet 10 of the gas tank 8 is initially closed by a flow-release actuator 13 which can take one of several configurations.

In the illustrated example, the actuator 13 comprises a moveable element 14, such as a sliding rod or the like, which is initially provided in a position in which it blocks the outlet 10 of the tank 8. The actuator 13 also comprises a pyrotechnic charge 15, such as a squib, which is electrically connected to a control unit 16. The control unit 16 is electrically connected to a sensor 17 configured to detect the occurrence of an emergency situation likely to render the battery 2 dangerous. The sensor 17 can thus take one of several forms. For example, the sensor can take the form of a crash sensor configured to detect the occurrence, or likely occurrence of a crash involving the motor vehicle. Alternatively, the sensor 17 could take the form of a temperature sensor arranged to measure the temperature of the battery 2.

The control unit 16 is configured to analyse the signals generated by the sensor, for example by comparing the signals received from the sensor with threshold values indicative of an emergency situation, and to send an actuation signal to the pyrotechnic charge 15 in the event that the control unit determines that the battery 2 must be made safe. Upon receipt of the actuation signal from the control unit 16, the pyrotechnic charge will ignite, thereby moving the rod 14 out of its initial position, and thus opening up a flow path for the gas 9 through the outlet 10 and in to the inlet port 11 of the manifold 12. As the compressed gas is released, the reduction of pressure in the gas tank 8 causes the gas to cool rapidly.

However, it should be appreciated that the flow-release actuator 13 could have an alternative configuration. For example, it is envisaged that the outlet 10 of the tank 8 could be initially closed by a rupturable membrane extending across the outlet, and in such an arrangement the pyrotechnic charge could be arranged to rupture the membrane directly upon ignition, or alternatively to drive an element such as a sliding rod, or even a projectile, so as to rupture the membrane.

Within the inlet 11 of the manifold 12, there is provided a moveable piston 18 which is arranged to move from an initial position illustrated in dashed lines and which the piston adopts prior to actuation of the safety arrangement, and a second position illustrated in solid lines in FIG. 1. The piston comprises a piston head 19 which is arranged as a tight sliding fit within the inlet port 11 of the manifold 12. The piston 18 further comprises a piston rod 20 which extends through a seal 21 provided in the wall of a recess 22 formed in the manifold, so as to extend out of the manifold. At the end of the piston rod 20 opposite to the piston head 19, the piston carries a knife element 23 having a blade with a sharpened edge 24. The knife element 23 is formed from non-conductive material such as plastics material or a ceramic material.

As will be appreciated, when the piston 18 is located in its initial position illustrated in dashed lines in FIG. 1, the knife element 23 is located generally adjacent the conductor 7, whilst being substantially clear of the conductor. On the opposite side of the conductor 7, there is provided a structure comprising a hole or recess 25 sized to accommodate and substantially receive the knife element 23 when the piston 18 adopts the second position illustrated in solid lines in FIG. 1.

Upon actuation of the safety arrangement 1, the pyrotechnic charge 15 is ignited, thereby opening the outlet 10 of the gas tank 8 in the manner described above. This will thus release high pressure gas 9 into the inlet 11 of the manifold 12, and the gas will thus act against the piston head 19, thereby driving the piston 18 from its initial position illustrated in dashed lines in FIG. 1 to the position illustrated in solid lines in FIG. 1, in which the piston head 19 becomes accommodated within the recess 22. During this movement of the piston 18, the knife element 23 is urged against the conductor 7 such that its sharpened edge 24 cuts through the conductor 7, with the knife element 23 then being received within the hole or recess 25 located on the opposite side of the conductor 7. This mechanism is thus effective to electrically disconnect the battery 2 from the circuitry 6 of the motor vehicle, thereby eliminating any risk of the structure of the motor vehicle becoming live in an accident situation.

Movement of the piston 18 from its initial position illustrated in dashed lines in FIG. 1 to its second position illustrated in solid lines in FIG. 1 is also effective to open up the main part of the manifold 12 for fluid communication with the inlet port 11, via a transfer port 26. The inert gas 9 is thus allowed to flow through the transfer port 26 and along the main flow passage of the manifold 12 towards the battery 2.

At a position generally adjacent the battery 2, the manifold 12 is provided with a plurality of flow ducts 27, each of which is provided in direct fluid communication with the main flow passage of the manifold and which is orientated so as to direct a respective flow of the inert gas substantially towards the battery 2. In particular, as illustrated in FIG. 1, each flow duct 27 is actually arranged so as to direct a respective flow of the inert gas generally between adjacent cells 4 of the battery 2, via a respective nozzle arrangement 28 provided through the battery housing 3, as will be described in more detail below.

It will thus be appreciated that upon actuation of the safety arrangement of the present invention as described above, the inert gas 9 flows through the manifold arrangement 12 such that individual jets of the gas are directed into the battery housing 3, thereby serving to cool the battery and hence reducing the risk of the battery reaching an elevated temperature sufficient to represent an explosion or fire risk.

A baffle arrangement is provided within the battery housing 3, which in the arrangement illustrated takes the form of a deflector plate 29 arranged generally below the battery 2. The deflector plate 29 may be formed integrally with the structure of the battery housing 3, and is provided with a plurality of apertures 30. As will be noted in the arrangement of FIG. 1, none of the apertures 30 provided through the deflector plate 29 are provided in direct alignment with any of the flow nozzles 28. The effect of the deflector plate is thus to deflect the individual jets of cooling gas directed between adjacent cells 4 of the battery by the nozzles 28, thereby redirecting the cooling gas in a more diffuse manner, against the individual cells 4, whilst also permitting a diffuse flow of cooling gas to pass through the apertures 30 formed in the deflector plate 29.

Below the deflector plate 29, and thus located on the opposite side of the deflector plate to the individual cells 4, there are provided a plurality of discharge resistors 31. Each discharge resistor 31 is associated with, and generally aligned below, a respective cell 4 and is electrically connected across a pair of elongate conductors 32 which extend through the deflector plate 29 and lie generally adjacent the cell 4 so as to adopt a position located in the space between adjacent cells. As will be explained in more detail below, the conductors 32 are initially electrically isolated from the cells 4.

As will be appreciated, the diffuse flow of cooling gas which passes through the deflector plate 29 thus serves also to cool the discharge resistors 31 provided in the lower region of the battery housing 3. The base of the battery housing 3 is provided with a series of outlet apertures 33 to allow the cooling gas to vent from the housing 3.

Figure 2:
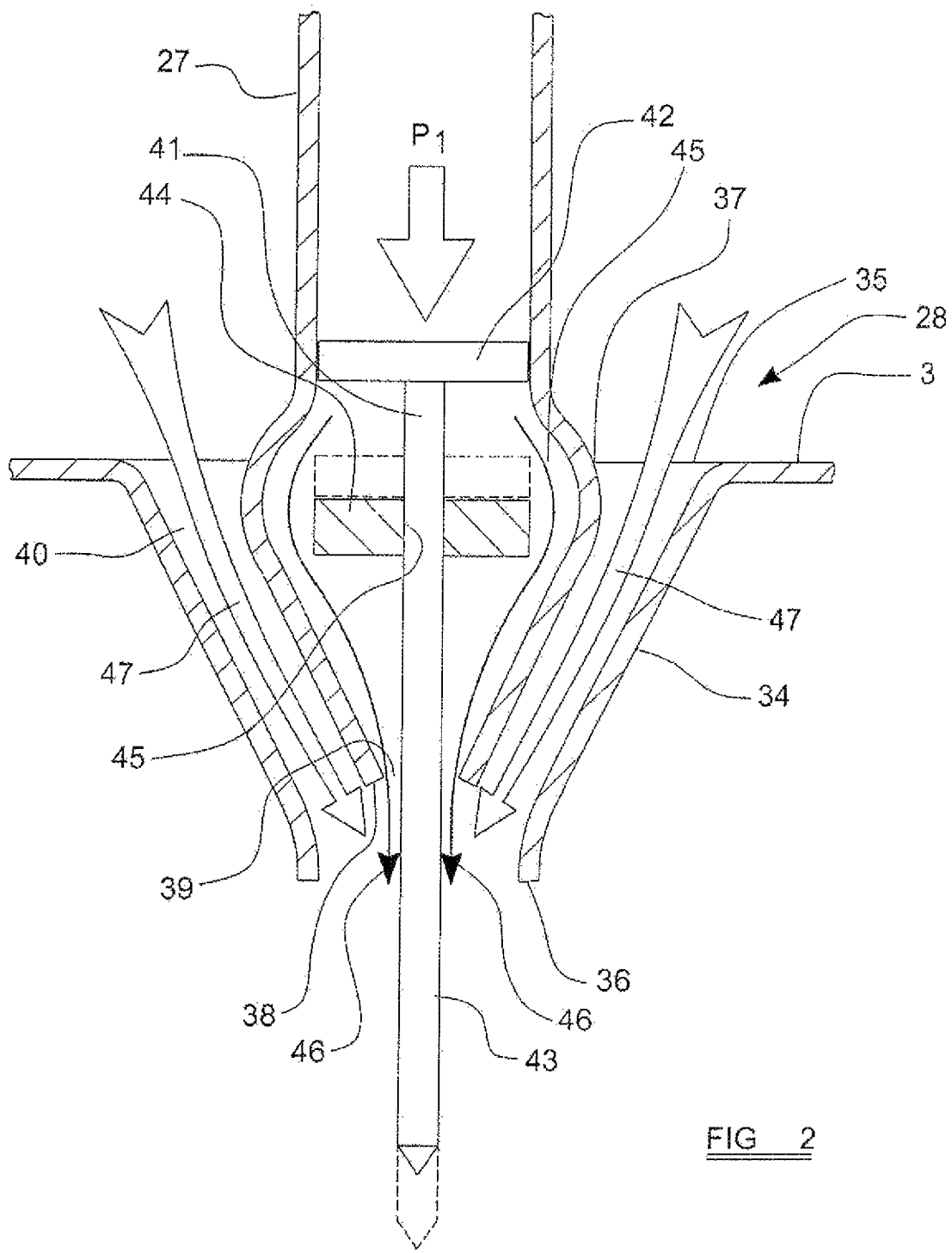
FIG. 2 is an enlarged, vertical cross-sectional view showing a nozzle arranged to direct a flow of cooling gas through a housing provided around the battery.

FIG. 2 illustrates the configuration of an individual flow nozzle 28 in more detail. Each flow nozzle 28 comprises a substantially frustoconical funnel 34, which is preferably formed integrally with the battery housing 3 and which extends inwardly from the upper wall of the battery housing so as to define a relatively large inlet aperture 35 at its upper end, and a relatively small outlet aperture 36 at its lower end.

A respective flow duct 27 extends into the funnel 34 and is generally aligned with the funnel 34 so as to be substantially coaxial therewith. As illustrated in FIG. 2, at its lower end generally within the space defined by the funnel 34, the flow duct 27 is provided with a generally "tulip" shaped formation which initially widens (at 37) before then narrowing towards its lowermost end 38 so as to form an outlet port 39. As illustrated in FIG. 2, the lowermost end 38 of the flow duct 27, and hence the outlet port 39 of the flow duct, is located slightly inwardly of the outlet aperture 37 defined by the lowermost end of the funnel 34.

The above-described nozzle structure thus serves to define a generally annular, but narrowing, inlet passage 40 formed between the funnel 34 and the end region of the flow duct 27. The inlet passage 40 is open to the surrounding atmosphere at its upper end and thus defines an inlet passage for the flow of ambient air into the casing 3 as will be described in more detail below.

A piston 41 is provided within the end region of each flow duct 27, each piston comprising a piston head 42 from which extends an elongate piston rod 43, the piston rod 43 extending downwardly so as to pass through the outlet port 39 of the flow duct 27 with sufficient clearance to define an annular gap. The piston rod 43, or at least its lowermost region, is formed from non-conductive material such as plastics material or a ceramic material.

The piston head 42 is sized and configured so as to form a close sliding fit within the linear region of the flow duct 27 located immediately upstream of the widened region 37. FIG. 2 illustrates the piston in its initial position in which the piston head 42 thus substantially seals against the inner wall of the flow duct 27.

Located below the level of the upper wall of the battery housing 3, at a position within the widened region 37 of the flow duct 27, there is provided a generally annular structure 44 having a central aperture 45 through which the piston rod 43 extends.

As will be appreciated, with the piston 41 of each nozzle arrangement 28 located in the initial position shown in solid lines in FIG. 2, each flow duct 27 is effectively sealed and the interior of the battery compartment 3 is exposed to the atmospheric conditions outside the compartment. However, upon actuation of the safety arrangement of the present invention, by ignition of the pyrotechnic charge 15, the inert gas 9 is caused to flow through the manifold system 12 and down each flow duct 27 so as to apply a pressure $P_1$ acting downwardly on each piston 41. This static pressure $P_1$ acting on each piston 41 forces the piston downwardly, such that the piston head 42 thus moves out of the linear section of the flow duct 27 and into the position illustrated in dashed lines in FIG. 2 in which the piston head lies within the widened region 37 of the flow duct. The structure 44 effectively defines a stop, thereby defining a lower limit to the downward movement of the piston 41. As will be appreciated from FIG. 2, when the piston 41 is driven downwardly in this manner such that its piston head 42 moves into the widened region 37 of the flow duct 27, an annular gap 45 opens up between the piston head 42 and the widened region 37 of the flow duct. The inert gas 9 is thus allowed to flow through the gap 45 and past the piston head 42. However, the gap 45 effectively represents a constriction which is thus effective to accelerate the flow of inert gas through the end region of the flow duct 27. Furthermore, the annular gap formed between the narrowed lowermost end 38 of the flow duct and the piston rod 43 also represents a constriction through which the flow of inert gas is accelerated. Arrows 46 in FIG. 2 illustrate this accelerated flow of inert gas.

Due to the acceleration imparted to the flow of inert gas as it passes through the outlet port 39, the local pressure within the nozzle falls significantly below the atmospheric pressure outside the battery housing 3, which is thus effective to draw a secondary flow of ambient air into the nozzle via the inlet 40, the secondary flow being illustrated schematically by arrows 47 in FIG. 2. The nozzle 28 will thus be understood to have a venturi configuration which is effective to accelerate the primary flow 46 of inert gas and also to draw-in a secondary flow 47 of ambient air. The nozzle arrangement 28 thus effectively entrains the secondary flow of ambient air in the primary flow of inert gas, thereby combining the two flows.

By combining a secondary flow of ambient air with the primary flow of inert gas in the manner described above, the arrangement of the present invention allows the total volume of cooling fluid directed towards the battery 2 to be increased by the addition of ambient air to the inert gas 9. This allows very effective cooling of the battery 2 without requiring an excessively large volume of inert gas 9 to be stored in the tank 8, thereby allowing the physical dimensions of the tank 8 to be minimised which is important when considering the installation environment of a motor vehicle.

Figure 3:
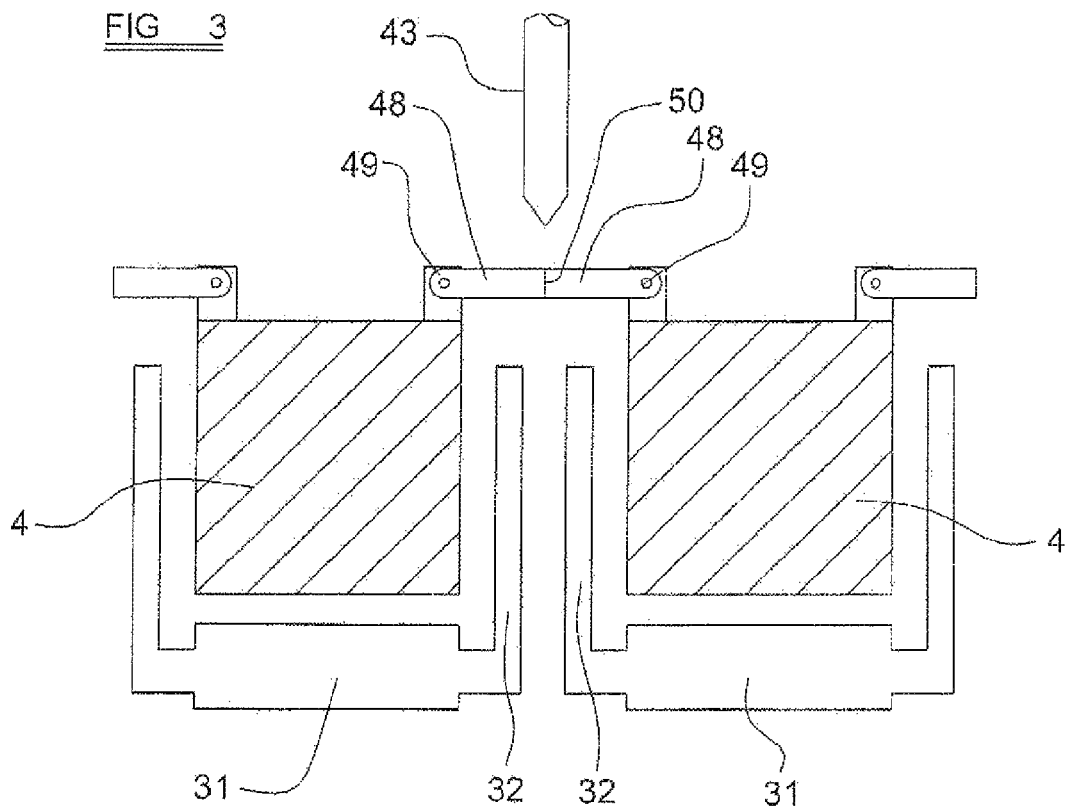
FIG. 3 is a schematic illustration showing an electrical connection provided between two adjacent cells of the battery, in an initial condition.

FIG. 3 illustrates a pair of adjacent cells 4 formed within the battery 2, each cell 4 being associated with a respective discharge resistor 31. As will be appreciated, for the sake of simplicity, the deflector plate 29 is omitted from FIG. 3.

The adjacent cells 4 are initially electrically connected by two pairs of electrically conductive contacts 48 (only one pair being shown in FIG. 3 for the sake of clarity). Each contact is electrically connected to a respective cell and is physically connected to the cell via a respective pivotal connection 49. FIG. 3 illustrates the two contacts 48 of one pair in an initial position during normal operation of the vehicle and the battery, in which the contacts 48 make electrical connection with one another as illustrated at 50. The lowermost end of a respective piston rod 43 is also illustrated in FIG. 3, showing the piston rod in its initial position (corresponding to that illustrated in solid lines in FIG. 2) in which the lowermost end of the piston rod is located at a position spaced slightly above the point of connection 50 between the two contacts 48.

Figure 4:
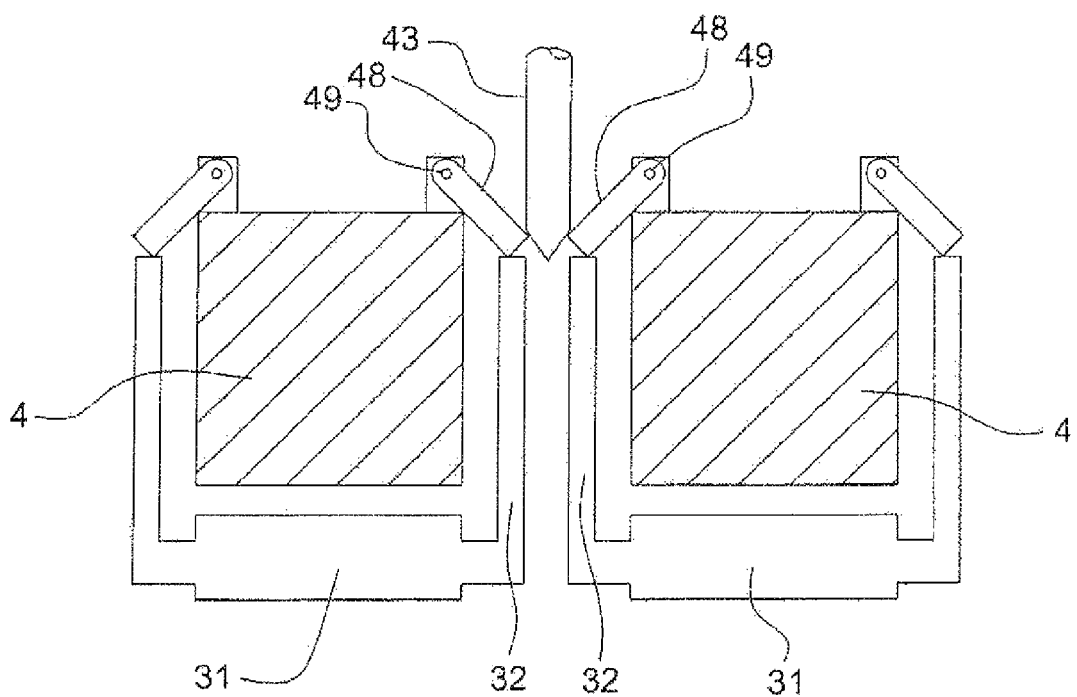
FIG. 4 is an illustration, corresponding generally to that of FIG. 3, showing the electrical connection between the adjacent cells having been broken.

FIG. 4 illustrates the arrangement of FIG. 3 in a condition following actuation of the safety arrangement 1 of the present invention. In particular, it can be seen that the lower end of the piston 43 has moved downwardly as a result of the pressure exerted on the piston 41 by the inert gas so as to bear against the two contacts 48, thereby moving the contacts so that they pivot downwardly about their respective pivotal connections 49. The electrical connection 50 between the two contacts 48 is thus broken, and by virtue of the non-conducting nature of the piston rod 43, the two cells 4 are thus electrically isolated from one another.

Although not illustrated in FIG. 4, it will be appreciated that the electrical connection between all adjacent cells 4 making up the battery 2 are disconnected in a similar manner. By electrically disconnecting the individual cells 4 of the battery 2 from one another in this manner, the battery 2 is rendered safe because the individual voltage (for example approximately 4 volts) of each cell 4 is not hazardous.

As also illustrated in FIG. 4, the downward movement of the piston rod 43 is also effective to move each contact 48 into electrical connection with a respective conductor 32, the arrangement thus being effective to simultaneously disconnect adjacent cells 4 from one another and instead connect each cell 4 across its respective discharge resistor 31 thereby allowing safe and fast discharge of the cells in a controlled manner.

Whilst the contacts 48 described above and illustrated in FIGS. 3 and 4 are arranged so as to be pivotally connected to the respective cells 4 of the battery, it is to be appreciated that alternative configurations are possible in this regard. For example, it is envisaged that in a variant of the invention, the contacts 48 could be physically connected to the cells 4 in a non-pivotal manner, and could instead be formed so as to be deformable. In such an arrangement, downwards movement of the piston rod 43 would thus be effective to bend the two contacts 48 and hence move the contacts out of electrical connection with one another, and instead move the two contacts into electrical connection with respective resistor conductors 32.

Whilst the proposed safety arrangement has been described above in terms of a specific embodiment in which disconnection of the battery 2 from the vehicle circuitry 6, disconnection of the individual cells 4 from one another, and connection of the cells 4 across respective discharge resistors is effected by the movement of pistons which are driven by the flow of gas produced from the tank 8, it is to be appreciated that alternative arrangements can be used for such purposes without departing from the scope of this aspect of the invention. For example, it is envisaged that in variants of the safety arrangement, separate pyrotechnic charges could be used to disconnect the individual sub-units 4 from one another, and also optionally to connect the sub-units across respective discharge resistors, for example in response to another actuation signal from the control unit. Alternatively, the pyrotechnic charges could be arranged so as to be ignited in direct response to the flow of gas arising from the tank 8.

Also, it is to be appreciated that although the specific safety arrangement of the invention illustrated and described in detail above is configured to mix the primary flow of gas 9 with a secondary flow of ambient air prior to direction against the battery 2 for cooling purposes, mixture with the ambient air may not be desirable in certain arrangements. For example, in an arrangement in which the inert gas is not mixed with ambient air containing oxygen, the gas will act as a fire suppressant as well as a coolant, thereby reducing the potential for fires occurring in the region of the energy storage unit 2 in the event of over-heating or the occurrence of a short circuit.

A further development of the specific safety arrangement described above could involve the provision of at least one electric fan arranged for electrical connection to the energy storage unit 2 in a similar manner to the above-mentioned proposals for connection of the discharge resistors to the storage unit. In such an arrangement, it is envisaged that the or each fan would be configured so as to have a significant electrical resistance in order to provide a similar discharge function. The or each fan would thus be arranged so to direct a cooling flow of air, inert gas, or a combination of both against the storage unit whilst also serving to rapidly discharge the storage unit (either in addition to or instead of the discharge resistors described above).

When used in this specification and claims, the terms "comprises" and "comprising" and variations thereof mean that the specified features, steps or integers are included. The terms are not to be interpreted to exclude the presence of other features, steps or components.

The invention claimed is:

1. A safety arrangement for a motor vehicle comprising:
an electrical energy storage unit;
a source of compressed non-conductive gas;
a flow-release actuator, the flow-release actuator being actuable upon receipt of an actuation signal so as to release a flow of gas from the source, the arrangement being configured such that the flow is directed substantially onto the storage unit so as to cool the unit; and
a cutting mechanism operable under action of the flow of gas to sever a conductor electrically connecting the storage unit to circuitry provided within the vehicle.

2. The safety arrangement according to claim 1, wherein the flow-release actuator comprises a pyrotechnic charge arranged to open an outlet from the source of compressed gas upon ignition.

3. The safety arrangement according to claim 1, further comprising at least one flow duct arranged to direct the flow of gas onto the storage unit, the arrangement being configured to combine a secondary flow of ambient air with the flow of gas.

4. The safety arrangement according to claim 1, configured for use with an electrical storage unit of a type comprising a plurality of sub-units electrically connected in series, the safety arrangement comprising a mechanism operable under action of the flow of gas to electrically disconnect the sub-units from one another.

5. The safety arrangement according to claim 4, wherein the mechanism is configured to electrically connect at least one of the sub-units across a discharge resistor substantially simultaneously with electrical disconnection of the sub-units from one another.

6. The safety arrangement according to claim 1, wherein the cutting mechanism comprises a knife arranged to be driven under action of the flow of gas from a first position in which it is substantially clear of the conductor, to a second position, the knife being arranged so as to cut the conductor during movement from the first position to the second position.

7. The safety arrangement according to claim 6, wherein the knife is substantially non-conductive.

8. The safety arrangement according to claim 3, having at least one venturi arrangement comprising a primary flow passage having a constriction to accelerate the flow of gas, and an air inlet, the venturi arrangement being configured to draw ambient air through the inlet.

9. The safety arrangement according to claim 8, wherein the energy storage unit is provided within a housing, and each venturi arrangement forms at least part of a nozzle arranged to direct the flow of gas, and the flow of ambient air through the housing.

10. The safety arrangement according to claim 4, wherein the mechanism comprises a piston arranged to move from an initial position to an operative position under action of the flow of gas, the piston being arranged to break electrical connection between the sub-units during movement from the initial position towards the operative position.

11. The safety arrangement according to claim 10, provided in combination with an electrical storage unit, the safety arrangement configured such that each pair of adjacent sub-units are electrically connected via a pair of contacts, each contact extending from a respective sub-unit and initially making electrical contact with the other contact, wherein the piston is arranged to deform or move the contacts out of electrical contact with one another as it moves from the initial position to the operative position.

12. The safety arrangement according to claim 11, wherein the mechanism is configured to electrically connect at least one of the sub-units across a discharge resistor substantially simultaneously with electrical disconnection of the sub-units from one another, the arrangement being configured such that movement of the piston from the initial position to the operative position is effective to deform or move each contact into electrical connection with a discharge resistor.

13. The safety arrangement according to claim 1, wherein the energy storage unit comprises either a capacitor or a battery.

14. The safety arrangement according to claim 1, in combination with a motor vehicle, wherein the motor vehicle is an electric vehicle or a hybrid vehicle.

* * * * *